United States Patent
Riddington et al.

(10) Patent No.: US 7,961,675 B2
(45) Date of Patent: Jun. 14, 2011

(54) GENERIC TRAU FRAME STRUCTURE

(75) Inventors: Eddie Riddington, London (GB); Shkumbin Hamit, Helsinki (FI)

(73) Assignee: Spyder Navigations L.L.C., Wilmington, DE (US)

( * ) Notice: Subject to any disclaimer, the term of this patent is extended or adjusted under 35 U.S.C. 154(b) by 626 days.

(21) Appl. No.: 10/579,404

(22) PCT Filed: Nov. 14, 2003

(86) PCT No.: PCT/IB03/05531
§ 371 (c)(1),
(2), (4) Date: Mar. 28, 2007

(87) PCT Pub. No.: WO2005/048623
PCT Pub. Date: May 26, 2005

(65) Prior Publication Data
US 2007/0268928 A1    Nov. 22, 2007

(51) Int. Cl.
*H04W 4/00* (2009.01)
(52) U.S. Cl. ........ 370/329; 370/328; 370/466; 455/560; 455/509
(58) Field of Classification Search .................. 370/328, 370/466; 455/560, 509
See application file for complete search history.

(56) References Cited

U.S. PATENT DOCUMENTS

| | | | |
|---|---|---|---|
| 5,892,802 A * | 4/1999 | Jung et al. | 375/354 |
| 5,920,545 A * | 7/1999 | Rasanen et al. | 370/232 |
| 6,067,289 A * | 5/2000 | Mueller et al. | 370/310 |
| 6,108,560 A | 8/2000 | Navaro et al. | |
| 6,138,020 A * | 10/2000 | Galyas et al. | 455/436 |
| 6,308,063 B1 | 10/2001 | Koistinen et al. | |
| 6,356,750 B1 | 3/2002 | Heikkila | |
| 6,421,527 B1 * | 7/2002 | DeMartin et al. | 455/67.13 |
| 6,532,236 B1 * | 3/2003 | De Vriendt | 370/395.1 |
| 6,636,497 B1 * | 10/2003 | Honkasalo et al. | 370/335 |
| 6,647,006 B1 * | 11/2003 | Rasanen | 370/345 |
| 6,721,304 B1 * | 4/2004 | Rasanen | 370/347 |
| 6,782,367 B2 * | 8/2004 | Vainio et al. | 704/500 |
| 6,879,599 B1 * | 4/2005 | Galyas et al. | 370/466 |
| 7,193,988 B2 * | 3/2007 | Niemela et al. | 370/347 |
| 7,693,126 B2 * | 4/2010 | Cayla et al. | 370/346 |
| 2002/0003783 A1 * | 1/2002 | Niemela et al. | 370/329 |
| 2002/0164992 A1 * | 11/2002 | Olsen | 455/452 |
| 2003/0067893 A1 * | 4/2003 | Dupuy et al. | 370/329 |
| 2003/0133494 A1 * | 7/2003 | Bender et al. | 375/130 |
| 2005/0018769 A1 * | 1/2005 | Hellwig et al. | 375/240.12 |

OTHER PUBLICATIONS

V. Di Claudio, F. Graziosi, F. Maurizio, F. Mecella, F. Santucci, A Proposal for Seamless Handovers in GSM Indoor Wireless Networks, *IEEE* 0-7803-6728-6, 2001, pp. 2544-2548.

Digital cellular telecommunications system (Phase 2+); In-band control of remote transcoders and rate adaptors for Enhanced Full Rate (EFR) and full rate traffic channels (GSM 08.60 version 7.0.1 Release 1998), *European Standard* (*Telecommunications series*), ETSI EN 300 737 v7.0.1. (Jan. 2000), pp. 1-32.

* cited by examiner

*Primary Examiner* — Huy D Vu
*Assistant Examiner* — Zewdu Beyen (57) ABSTRACT

There is disclosed a TRAU frame comprising, in sequence, a set of control bits, a set of class A bits, a set of error check bits, and a set of Class B bits, the set of control bits including at least one bit identifying the location of the other sets of bits in the frame.

37 Claims, 6 Drawing Sheets

GENERIC TRAU FRAME STRUCTURE

FIELD OF THE INVENTION

The invention relates to communication systems, and particularly to a transcoder/rate adaptor unit frame in the radio access network of a mobile communication system.

BACKGROUND TO THE INVENTION

In the global system for mobile communications (GSM) a transcoder rate adaptor unit (TRAU) is provided in the radio access network. The TRAU enables the use of different transmission rates over the Abis interface between a base station controller (BSC) and one or more base transceiver stations (BTSs). The switching sub-system to which the radio access network provides an interface for mobile stations operates at a bit rate of 64 kbps, which is the rate for which the mobile services switching centre (MSC) of the switching sub-system is designed.

It is well-known in GSM systems for adaptive multi-rate (AMR) to be supported, which enables the rate between the BSC and a BTS to be varied between one of eight different rates. Eight codecs are provided in the BSC, and an appropriate codec is chosen to ensure the required rate is used. For example, a reduced rate may be used where the quality of the air interface is known to be poor.

The codecs for selecting different rates are provided in the TRAU. The TRAU is logically associated with the BSC. In accordance with the particular codec selected for transmission on the Abis interface, a particular TRAU frame format is provided on the Abis interface. This frame is specific to the specific codec used. For example for AMR coding, the data rate in the TRAU frame is different for each codec, and the data bits are located in different positions for each TRAU frame. In the AMR example, where eight different codecs are provided, eight different TRAU frame formats are specified.

The third generation partnership project (3GPP) is proposing to introduce a flexible layer one (FLO) concept to support the handling of current and future services in the GERAN (GSM/EDGE radio access network). As part of current standardisation work in 3GPP, FLO is being introduced to the circuit switched part of the GERAN system.

The advent of flexible layer one in 3GPP systems provides the possibility for more flexibility in encoding techniques used in the radio access network. Potentially, therefore, in the future there may be provided many different types of codecs in the TRAU. Consequently, this will require many different types of TRAU frame formats. The advent of FLO may disadvantageously lead to the need to specify a number of different TRAU frame formats, by way of standardisation or otherwise.

It is an aim of the invention to address the above-stated problem.

SUMMARY OF THE INVENTION

According to the present invention there is provided a method of encoding a TRAU frame for a speech signal having a plurality of transport channels, the method including the steps of: determining a coding type for the speech signal; determining a set of bits associated with each transport channel of the speech signal; determining a priority for each transport channel; inserting into a TRAU frame the set of bits associated with the transport channel of highest priority; and repeating the inserting step sequentially for each transport channel in order of priority.

The method may include the steps of: determining any error checking associated with each transport channel; computing any error check bits for each transport channel; and the step of inserting any error check bits associated with such transport channel after the set of bits for that channel.

The method may further include the step of inserting control bits into said TRAU frame. The control bits may be inserted in a reserved location. The control bits may include a transport format combination indicator.

The speech signal may includes two transport channels comprising a set of class A bits and a set of class B bits, at least a portion of the class A bits being associated with a cyclic redundancy check, wherein a set of cyclic redundancy check bits are compiled in dependence on all the class A bits, the TRAU frame including, in sequence, the set of class A bits, the set of check bits, and the set of Class B bits. The TRAU frame may comprise an initial set of control bits. The set of cyclic redundancy bits may be compiled in further dependence on at least one control bit. In a further aspect the invention provides a method of decoding a received TRAU frame comprising sets of bits corresponding to a plurality of transport channels for a speech signal ordered in sequence in accordance with a priority associated with said channels, the method including the steps of: determining a coding type for the speech signal; locating a set of bits corresponding to each transport channel; and decoding the transport channels in dependence on the recovered data bits in accordance with the determined coding type.

The method may further comprise the steps of: locating any error check bits associated with each transport channel; and in dependence on the presence of error checking bits, error checking each transport channel.

The method may include the step of locating a set of control bits, said control bits including an indication of the coding type of the speech signal. Said set of control bits may include a transport format combination identifier.

A TRAU frame comprising sets of bits corresponding to a plurality of transport channels for a speech signal ordered in sequence in accordance with a priority associated with said channels. At least one transport channel may be associated with error checking bits, said error checking bits being ordered in sequence with the associated data bits.

The TRAU frame may further include a set of control bits. The control bits may include an indication of the coding of the speech signal. The indication may be a transport format combination identifier.

In a still further aspect the invention provides a TRAU frame comprising, in sequence, a set of control bits, a set of class A bits, a set of error check bits, and a set of Class B bits, the set of control bits including at least one bit identifying the location of the other sets of bits in the frame.

According to another aspect of the invention, there is provided a transcoder/rate adaptor unit adapted to encode a TRAU frame, including: coding detection means for determining a coding type for the speech signal; data determining means for determining a set of bits associated with each transport channel of the speech signal; priority determining means for determining a priority for each transport channel; insertion means for inserting into a TRAU frame the set of bits associated with the transport channel of highest priority; and the insertion means being adapted to sequentially insert each transport channel in order of priority.

The transcoder/rate adaptor unit may further include: error check determining means for determining any error checking associated with each transport channel; error check computing means for any error check bits for each transport channel; and the insertion means being further adapted to insert any error check bits associated with such transport channel after the set of bits for that channel.

The insertion means may be further adapted to insert control bits into said TRAU frame. The control bits may be inserted in a reserved location. The control bits may include a transport format combination indicator.

The speech signal may include two transport channels comprising a set of class A bits and a set of class B bits, at least a portion of the class A bits being associated with a cyclic redundancy check, wherein a set of cyclic redundancy check bits are compiled in dependence on all the class A bits, the insertion means being adapted to include in the TRAU frame, in sequence, the set of class A bits, the set of check bits, and the set of class B bits. The insertion means may be adapted to insert in the TRAU frame an initial set of control bits.

According to the invention there is provided in another aspect a transcoder/rate adaptor unit adapted to decode a TRAU frame comprising sets of bits corresponding to a plurality of transport channels for a speech signal ordered in sequence in accordance with a priority associated with said channels, including: coding determining means for determining a coding type for the speech signal; location determining means for locating a set of bits corresponding to each transport channel; and decoding means for decoding the transport channels in dependence on the recovered data bits in accordance with the determined coding type.

The transcoder/rate adaptor unit may further include: error check location means for locating any error check bits associated with each transport channel; and error checking means for error checking each transport channel in dependence on the presence of error checking bits.

The transcoder/rate adaptor unit may include control location means for locating a set of control bits, said control bits including an indication of the coding type of the speech signal.

Said set of control bits may include a transport format combination identifier. According to a further aspect of the invention there may be provided a transcoder/rate adaptor unit for encoding and decoding a TRAU frame comprising sets of bits corresponding to a plurality of transport channels for a speech signal ordered in sequence in accordance with a priority associated with said channels.

At least one transport channel may be associated with error checking bits, said error checking bits being ordered in sequence with the associated data bits.

The TRAU frame may include a set of control bits. The control bits may include an indication of the coding of the speech signal. The indication may be a transport format combination identifier.

In a still further aspect the invention provides a transcoder/rate adaptor unit for encoding and decoding a TRAU frame comprising, in sequence, a set of control bits, a set of class A bits, a set of error check bits, and a set of Class B bits, the set of control bits including at least one bit identifying the location of the other sets of bits in the frame.

In a further aspect, the invention provides a computer program adapted to perform any method described, or any method claimed. In another aspect the invention provides a computer program product for storing computer program code adapted to perform any described method, or any method claimed.

BRIEF DESCRIPTION OF THE FIGURES

The invention is now described with regard to an exemplary embodiment by way of reference to the accompanying figures in which:—

DESCRIPTION OF THE PREFERRED EMBODIMENTS

The invention is described herein by way of reference to particular exemplary embodiments. In particular the invention is described in the context of a GERAN. It should be understood, however, that the invention is not limited in its applicability to such a specific network scenario.

Figure 1:
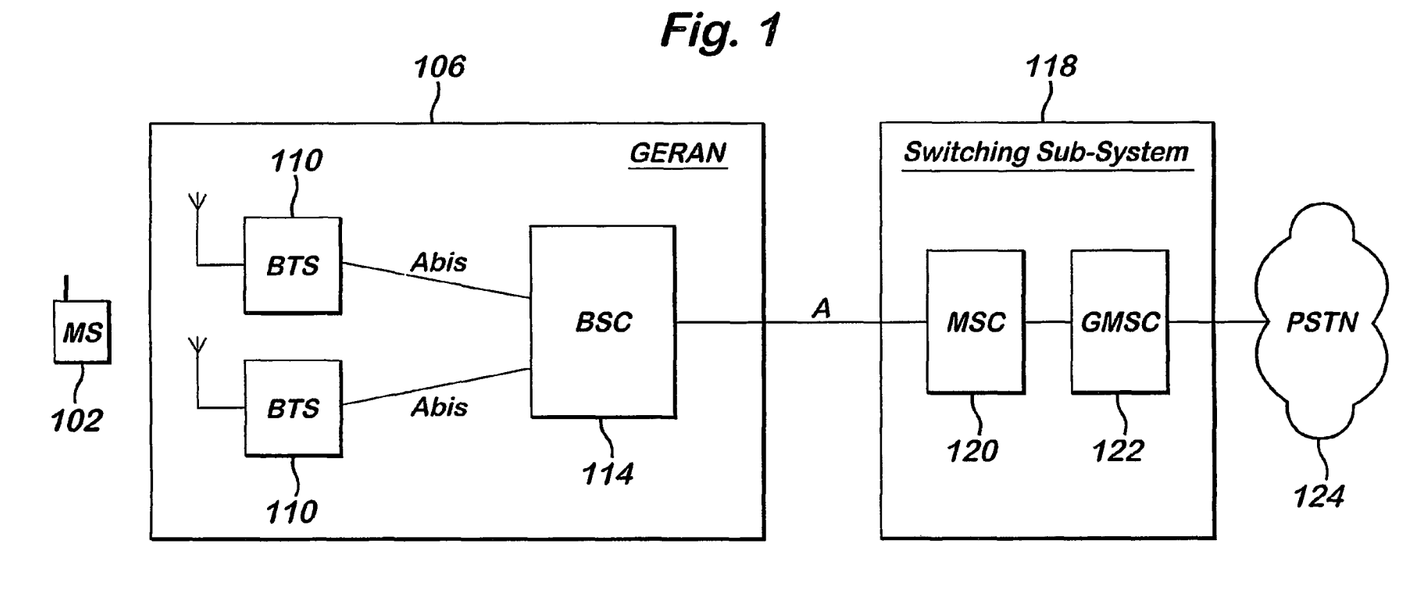
FIG. 1 illustrates a GERAN network architecture for implementation of an exemplary embodiment of the invention.

Referring to FIG. 1, there is illustrated the main components of an example GSM architecture. As illustrated in FIG. 1, a mobile station (MS) 102 accesses PSTN services 124 via a GERAN 106 and a switching sub-system 118. The GERAN 106 comprises a plurality of base transceiver stations (BTSs) 110, connected to a base station controller (BSC) 114 via Abis interfaces. Each of the GERAN 106 connect to a mobile services switching centre (MSC) 120 in the switching sub-system 118, which in turn connects to a gateway mobile services switching centre (GMSC) 122, which in turn connects to the PSTN 124.

Embodiments of the invention propose a generic TRAU frame structure for transmission on the Abis interface, which is independent of any specific coding technique. Thus, regardless of any new coding techniques proposed in the future, a single generic TRAU frame structure may be used.

Figure 2:
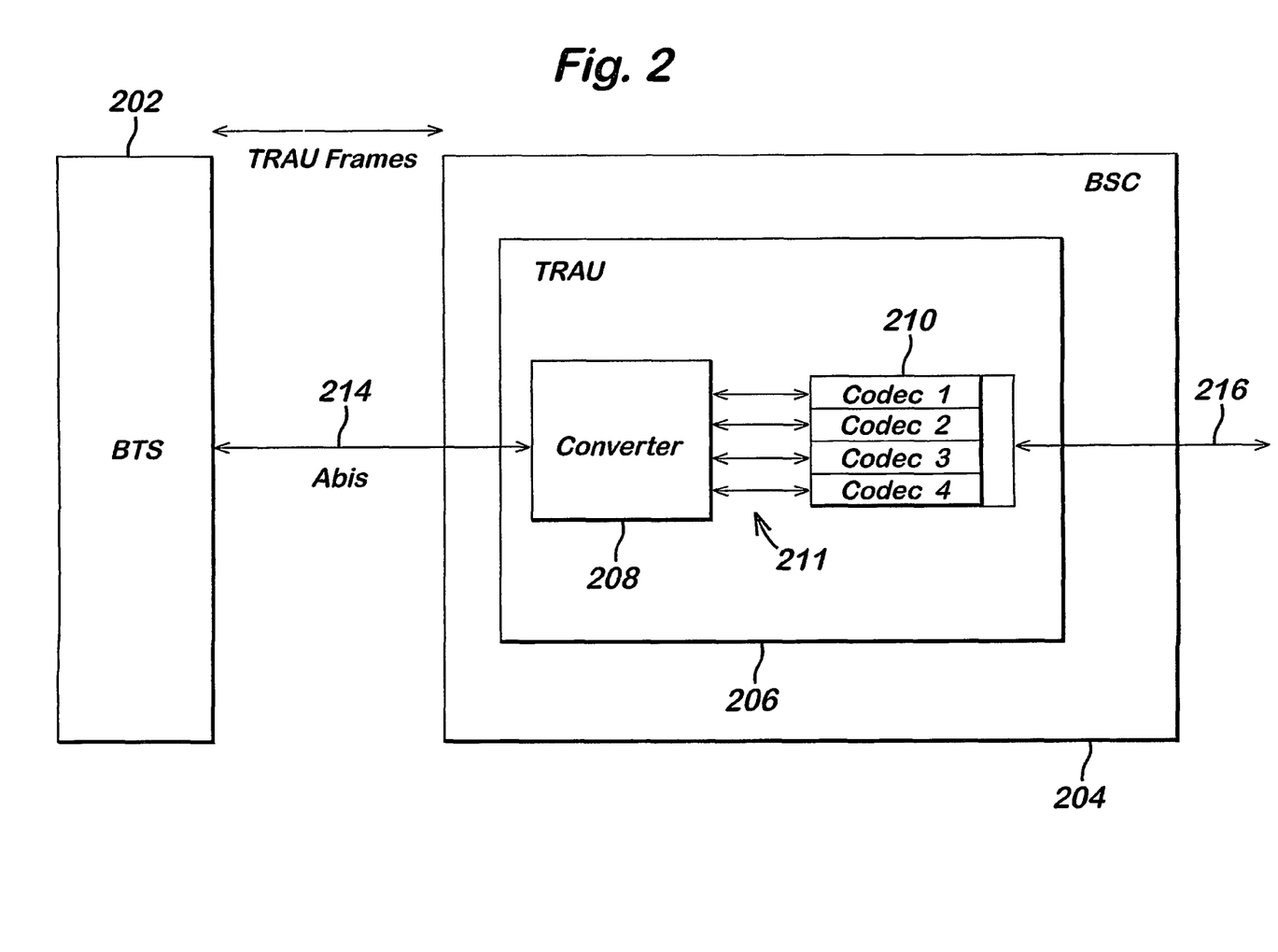
FIG. 2 illustrates a BTS and BSC interconnection for illustration of an exemplary embodiment of the invention.

Referring to FIG. 2, there is shown a BTS 202, and a BSC 204. The BSC 204 logically includes a TRAU 206. As discussed further hereinbelow, the TRAU is adapted, in accordance with embodiments of the invention, to include a converter block 208, in addition to a plurality of codecs 210. The BSC receives signals from the switching sub-system on an interface 216, and transmits signals to the switching sub-system on the interface 216. An interface 214 is provided between the BTS 202 and the BSC 204, being the Abis interface. TRAU frames are carried on the Abis interface 214.

The codecs 210 represent a number of codec functions available for the TRAU interface. In the example of FIG. 2, four codecs are shown. The number of codecs is implementation-dependent, and the invention is not limited in its applicability to any particular number of codecs being provided in the TRAU 206.

The invention is not concerned with the way in which a particular coding scheme is selected. The selection of a particular coding scheme is outside the scope of the invention.

For the purposes of describing an embodiment of the invention, it is assumed that the codecs 210 are adaptive multi-rate (AMR) codecs.

Figure 3:
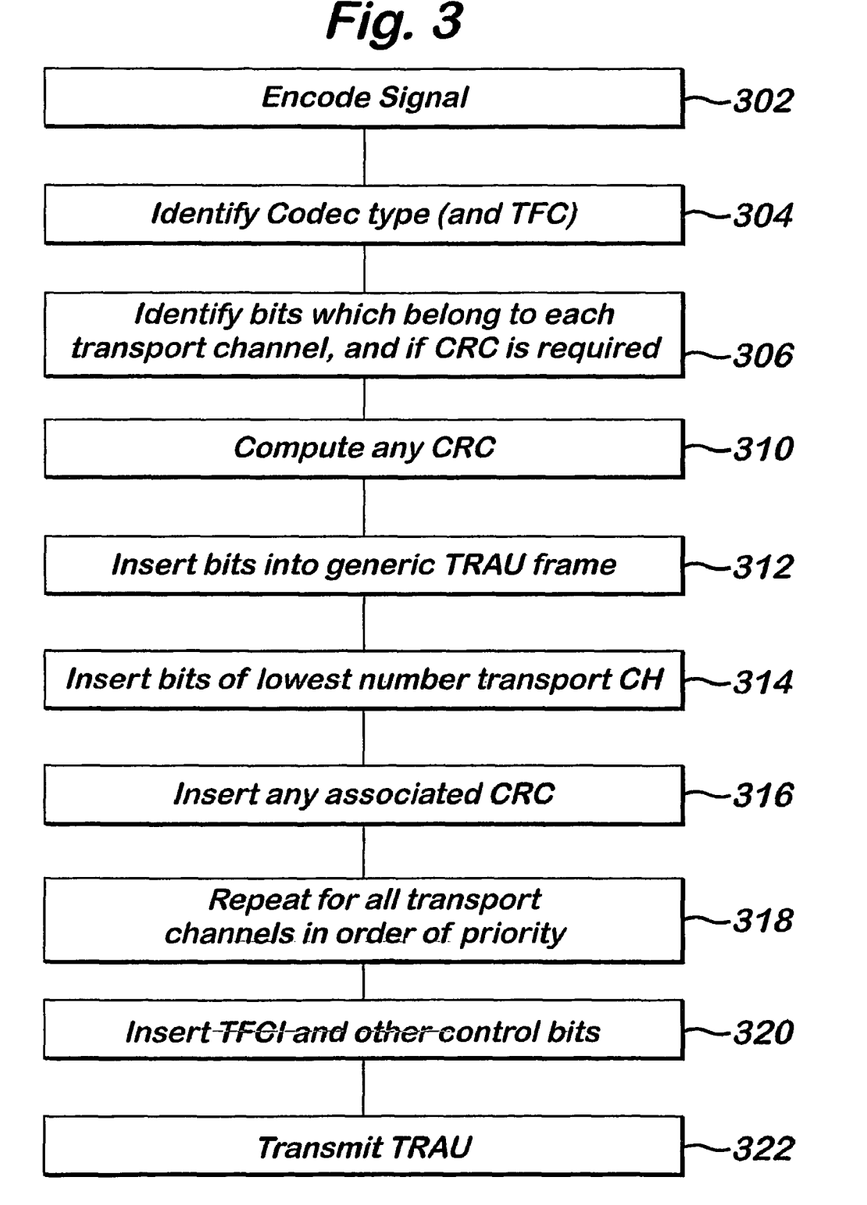
FIG. 3 illustrates the method steps in the transmission of a signal in an exemplary embodiment of the invention.

With reference to FIG. 3, there is described a preferred embodiment of the invention applied to a transmission from the network to a mobile station. As is known in the art, a signal for transmission is received on the interface 216 of the BSC 204, at a rate of 64 kbps. This signal is received at the TRAU 206 of the BSC 204, and provided to the appropriate one of the plurality of codecs 210 in accordance with the coding scheme in use.

As represented by step 302 in FIG. 3, initially an encoding step takes place in the selected coder 210. This is the "normal" coding step associated with the codec. This is a speech encoder operation which generates the speech coefficients, i.e. the payload for the TRAU frame. As described further hereinbelow, the converter 208 then builds a TRAU frame. As such, the converter 208 may be functionally considered a "TRAU build block".

Figure 5:
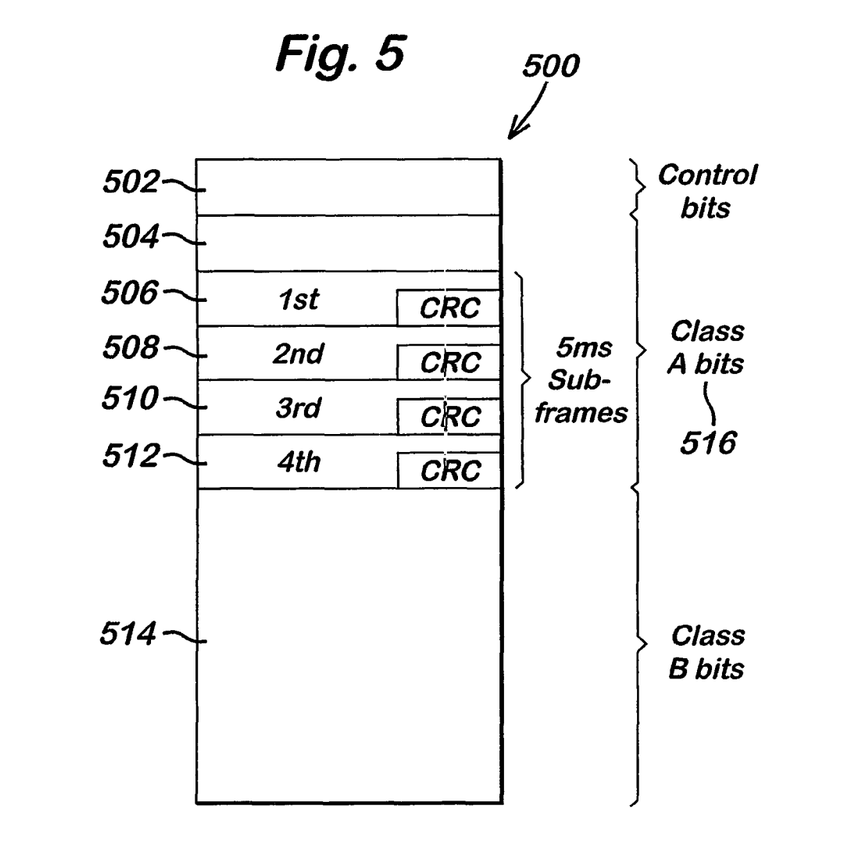
FIG. 5 illustrates an example of a prior art specific TRAU frame format.

Referring to FIG. 5, there is illustrated a TRAU frame built for an AMR codec in accordance with current technologies. As will be understood from the foregoing description, in the prior art the TRAU frame built will be specific to the speech coding being used in the codec 210. As can be seen in FIG. 5, the TRAU frame 500 comprises a set of control bits 502, a set of class A bits 516, and a set of class B bits 514. The class B bits comprise a set of bits to which no error check is applied. There are further four subsets of class A bits 506, 508, 510, 512 to which error checking is applied. The TRAU frame is a 20 ms frame, and for error checking the frame is split into four sub-frames of 5 ms each. A cyclic redundancy check (CRC) is applied to those class A bits in each 5 ms sub-frame. Thus, as shown in FIG. 5, each of the class A bit blocks 506, 508, 510, 512 has a CRC check sum associated therewith. An exception to this is the CRC associated with the first sub-frame 506, which is also applied to certain class A bits 504 that are not associated with a particular 5 ms sub-frame and the control bits 502. Thus, the selected codec 210 encodes the signal in the normal way, and generates such signal on an output 211 of the selected codec 210.

Turning again to FIG. 3, as represented by step 302 initially a speech encoding step takes place in the selected coder 210 in order to generate the speech coefficients for transmission, and then the converter block 208 builds a TRAU frame, as described further hereinbelow with reference to FIG. 3, in accordance with a set of rules. In a step 304, the converter block 208 identifies the coding type used to encode the speech signal, and consequently the transport format combination (TFC) for the speech signal. Each codec type has associated with it a transport format combination (TFC) which is known by the BSC and by the BTS. If the TRAU is located remotely from the BTS and BSC, then the transport format combination set (TFCS) is made known to the remote TRAU through appropriate signalling at call set-up.

In dependence upon such identification of the TFC, in a step 306 the converter block 208 is able to identify the transport channels present, their priority, the bits which belong to each transport channel and to identify whether a CRC is required. In the example of FIG. 5, the specific encoded TRAU frame 500 includes two transport channels. A first transport channel comprises the class A bits 516 and a second transport channel comprises the class B bits 514. The class A bits have a higher priority, or importance, than the class B bits. In prior art codecs, the class A bits and class B bits of the encoded speech are normally dispersed according to the design of the encoder, the location of which can be determined with a custom TRAU frame. In the case of services that will be supported by the generic TRAU frame of the invention, the converter 208 orders the bits according to subjective importance, starting from the most important bit first.

In a step 310, the converter 208 applies a CRC error checking code to the bits of the transport channels which require error checking.

In a step 312, the converter 208 then prepares to insert the data of the transport channels and any associated error checking bits into a generic TRAU frame. In a step 314, the converter 208 inserts the bits of the lowest transport channel into the TRAU frame. The 'lowest' transport channel is the channel having the bits considered to be of the highest importance. In a step 316 any error check bits, such as CRC bits, associated with the transport channel are then inserted into the frame by the converter.

As denoted by step 318, the steps 314 and 316 are then repeated for each further transport channel. The transport channels are dealt with in order of ascendancy, i.e. in order to number. This is on the basis that the transport channels are numbered in order of importance. Thus, the most important channels are processed first, and inserted into the frame first In a step 320, the converter inserts the TFCI and other control bits into the frame. It should be noted that this step is not dependent on the transport channels having already been inserted. The location of all the control bits is preferably reserved, and therefore the control bits may be inserted before, during or after insertion of the transport channel bits.

The characteristic of the generic TRAU frame is that its format will be adapted at call set-up for each transport format combination, preferably using the messages that are used to configure the flexible layer one. These messages provide for each transport format combination: the number of active transport channels; the number of bits that are sent over each active transport channel; and an indication of which bits require error checking, e.g. CRC checking.

Figure 6:
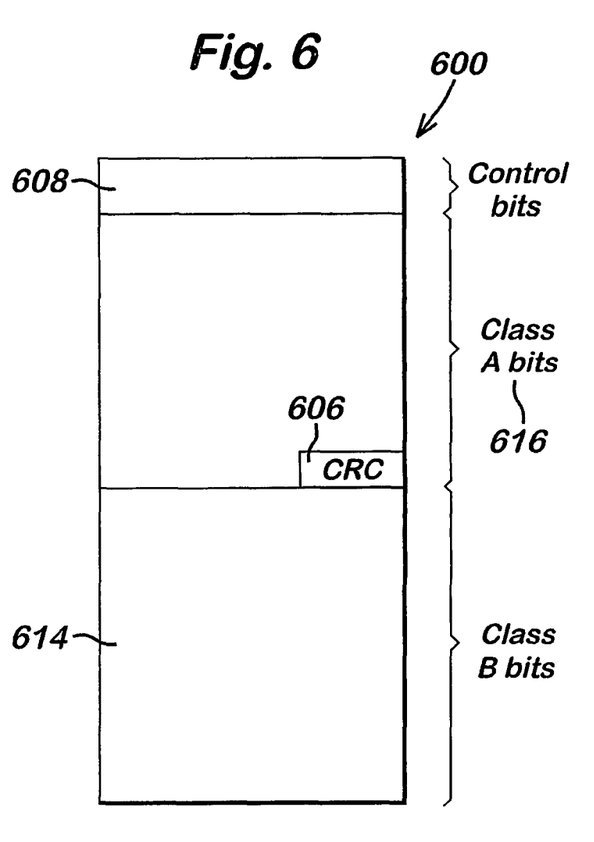
FIG. 6 illustrates an example of a generic TRAU frame format in accordance with an embodiment of the invention.

Referring to FIG. 6, the generic TRAU frame for a transport format combination comprising two transport channels is illustrated. In this example, the first transport channel carrying class A bits requires CRC protection and the second transport channel carrying class B bits which does not require CRC protection. The generic TRAU frame 600 comprises a set of control bits 608, a set of class A bits 616, a CRC 606 which has been computed for all of the class A bits 616 and the control bits 608, and a set of class B bits 614. In general, the bits belonging to each transport channel are ordered within the TRAU frame starting from the lowest transport channel number followed by any associated CRC (if any exists), to the highest transport channel number followed by any associated CRC (if any exists). The first CRC is also preferably applied to the control bits, where the control bits are required to be CRC protected. In an alternative to this, a CRC for the control bits may be included separately, for example where a transport format combination is used which does not consist of a transport channel which requires a CRC.

To signal the transport format combination that is currently in use (and consequently the TRAU frame format), a transport format combination identifier is also preferably carried within the generic TRAU frame, preferably within the control bits 608.

All of the control bits are in a fixed location in accordance with the generic TRAU frame structure, and are thus preferably independent of the coding technique. The implementation for a preferred set of control bits is discussed further hereinafter.

In a preferred embodiment of the invention, the existing TRAU control bits known from GSM signalling, and more specifically from AMR techniques, is utilised in the generic TRAU. However it is envisaged that in embodiments adapted control bits may be applied.

Figure 7:
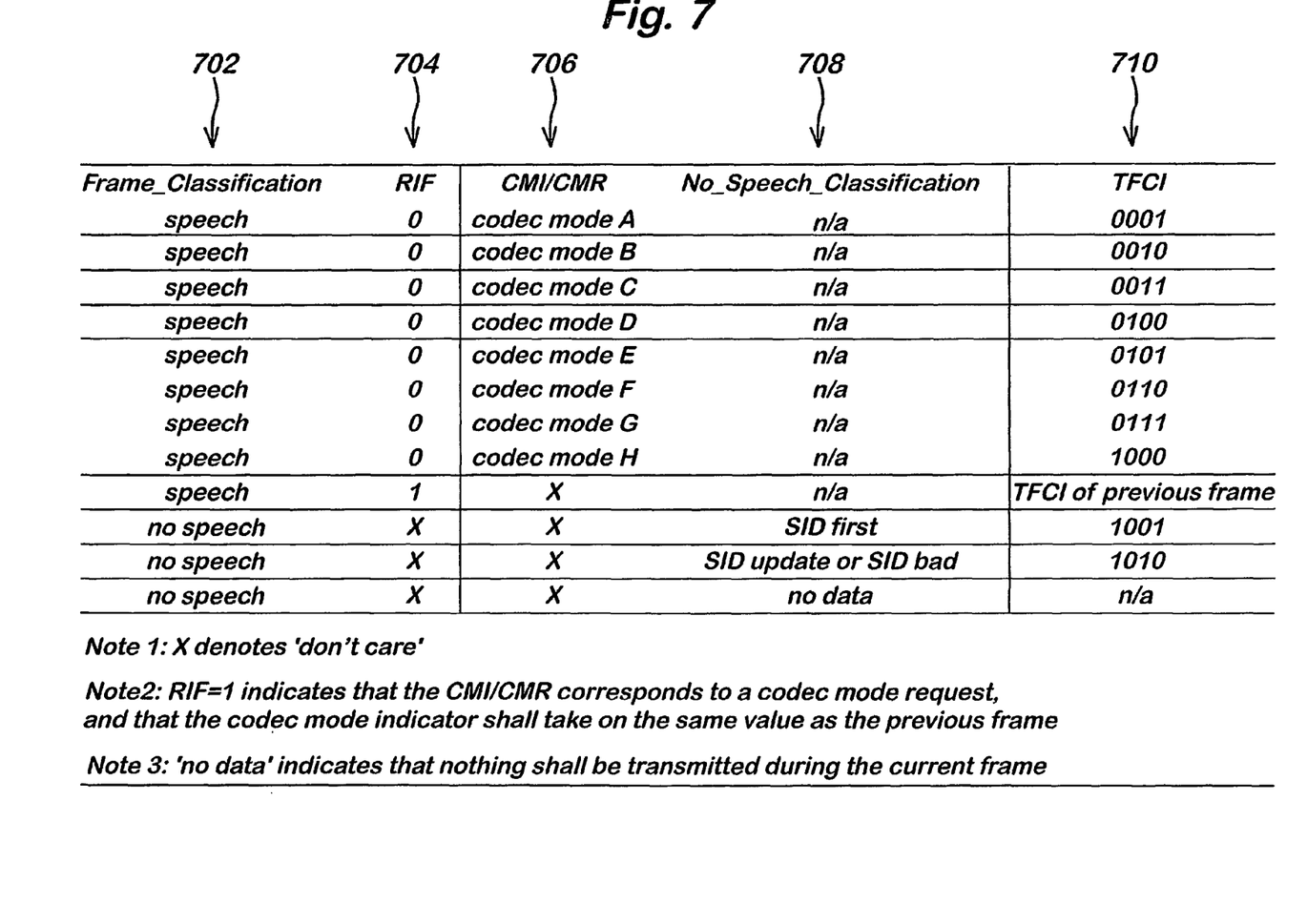
FIG. 7 illustrates an example of control bit mapping for a generic TRAU frame format in accordance with an embodiment of the invention.

Referring to FIG. 7, the use of control bits in the generic TRAU frame 600 is illustrated. The identifiers that are currently used in the TRAU frames to indicate the information content are "frame_classification" 702, "RIF" (request indicator flag) 704, "CMI/CMR" (codec mode indicator/codec mode request) 706, "no_speech_classification" 708.

These parameters may also be used to signal up to eight speech modes, as determined by the three bit CMI/CMR field 706. The parameters may be used to signal up to eight no-speech modes, as determined by the 3 bit no_speech_classification field 708. As such, they may be used to signal up to 16 transport format combinations (TFCs).

On the assumption that 16 TFCs are adequate for any new speech service over flexible layer one (FLO), then there is no requirement to change the TRAU frame control signalling to support FLO. All that is needed is a translation between the coding of these flags, and the coding of a 4 bit transport format combination identifier (TFCI) over the air interface. FIG. 7 provides a suggested translation from the "frame_classification" 702, "RIF" (request indicator flag) 704, "CMI/CMR" (codec mode indicator/codec mode request) 706, and "no_speech_classification" to a "TFCI" (transport format combination identifier) 710 in an embodiment of the invention.

The codec mode indicated in the control bits of the generic TRAU frame 600, confirms to a codec at the receiver side how many transport channels there are in the generic TRAU frame, where the data of the transport channels can be found, and whether any error checking applies to any portion of the data, and where such error checking information may be found. Thus no information needs to be transmitted in the generic TRAU frame itself as to where the information contained therein is located. This can be determined in dependence on the identity of the coding type contained in the TRAU frame control bits.

Referring to FIG. 3, once the TRAU frame is constructed, it is transmitted on the Abis interface as denoted by step 322. Thus, in accordance with the invention a generic TRAU frame format is used on the Abis interface 214 between the BTS 202 and the BSC 204.

It will be understood that in the mobile station, a functional equivalent to the converter 208 must be provided in order to convert the received format into the specific format associated with the coding technique. This can be achieved by such function extracting the identity of the coding from control bits, and applying an appropriate mapping function to map the bits retrieved into the required format associated with the coding technique, for decoding.

Figure 4:
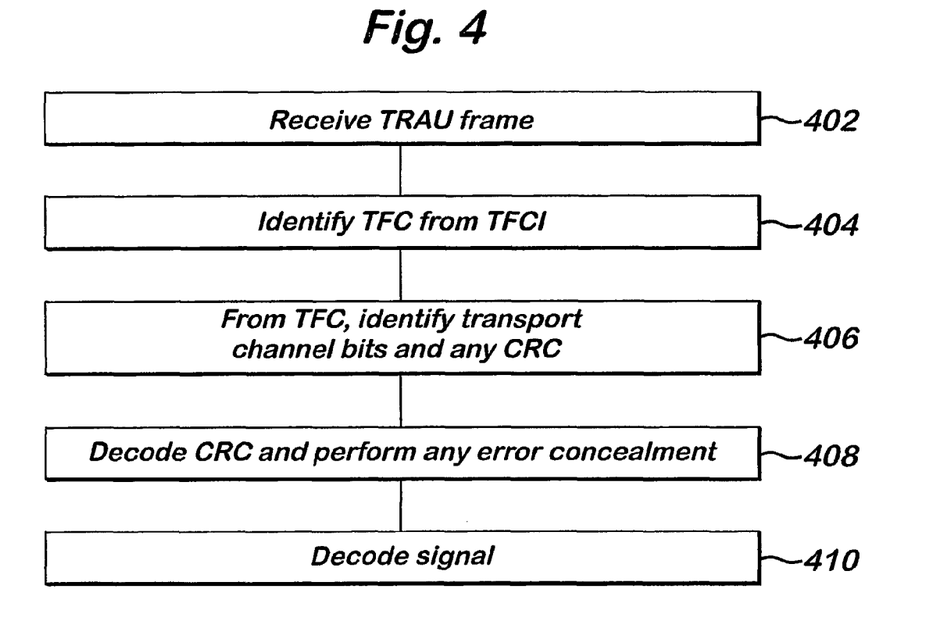
FIG. 4 illustrates the method steps on receipt of a signal in an exemplary embodiment of the invention.

Referring to FIG. 4, there is now described the reverse operation in the converter 208, for a signal received on the Abis interface 214 having a generic TRAU frame structure.

In such example, the equivalent converter function in the mobile station is assumed to have encoded a speech signal such that a generic TRAU frame format, is received and sent on the Abis interface from the BTS 202 to the BSC 204.

Referring to FIG. 4, in a step 402 the converter block 208 receives a generic TRAU frame of the format shown in FIG. 6.

In a step 404, the converter 208 determines the transport format combination (TFC), i.e. the coding technique associated with the transmission. This is determined from the transport format combination identifier (TFCI) bits found in the control bits 608 of the generic TRAU frame 600.

Based on the determination of the TFC, in a step 406 the converter 208 identifies the location of the bits of each transport channel and any associated error checking bits, and retrieves the transport channels and associated CRC (if any exist) from the generic TRAU frame. The location of the bits can be determined based on knowledge of the encoding techniques used, as discussed hereinabove. Thus, for the generic TRAU frame of FIG. 6, the class A bits 616 and the class B bits 614 are retrieved from the location within the generic TRAU frame for this type of coding.

In a step 408, any error checking is performed. Thus, for the example of FIG. 6, a CRC check is performed on the class A bits 616, and compared with the transmitted CRC checks sum 606.

Thereafter, depending on the outcome of the CRC check, the TRAU performs either error concealment procedures, or sends the encoded signal to the one of the codecs 210 associated with the coding used, and in a step 416 decoding for the encoded signal is applied.

It should be noted that in the above described embodiments, on transmission the signal to be transmitted is first encoded in accordance with the specific coding technique, before the converter block 208 converts it into a generic format. In embodiments, it is envisaged that the codec specific encoding may be bypassed, and the encoding into the generic TRAU frame format performed directly. However the insertion of the converter 208 in front of the codec 210 in FIG. 2, such that encoding and decoding applies to all transmissions, simplifies the implementation of the invention.

The use of a generic TRAU frame format in accordance with the invention, and the described embodiments herein, reduces the time and work needed during the standardisation process for any new speech codec/data service, and reduces the time and work needed during the implementation process for any new speech codec/data service, or for existing codecs which have yet to be implemented (for example AMR-WB).

The complexity of the implementation of the generic TRAU frame format is reduced if the same configuration message to configure the flexible layer one is used to configure the generic TRAU frame, and the signalling flags within the existing TRAU frame structure are reused to signal the TFCI.

In current known implementations, such as AMR coding techniques, the unequal error detection (UED) applied on the Abis interface is stricter than on the air interface. However, in practice, the Abis interface is more reliable than the air interface. The use of the generic TRAU frame format as proposed herein, enables the UED applied on the Abis interface to be adapted such that it is the same as that applied on the air interface in any given implementation. The granularity of the UED may therefore be reduced to that used over the air interface. This is illustrated by the examples of FIGS. 5 and 6, where in FIG. 6 the granularity of the UED in the generic TRAU frame format is adapted to be thus used over the air interface. The advantage of this approach is that it avoids the need to signal to the BTS the location of the bits belonging to each 5 ms sub-frame.

The invention has been described herein by way of reference to embodiments applied in the GERAN, and more specifically in association with the introduction of flexible layer one in the GERAN. The invention is not, however, limited to such a specific environment. More generally, the invention applies to any scenario where there is a requirement for a TRAU frame.

One skilled in the art will appreciate the possible adaptations and modifications to the invention as described in the embodiments. The scope of protection afforded by the invention is defined by the appended claims.

The invention claimed is:

1. A method comprising:
   determining a coding type for a speech signal via a transcoder and rate adaptor unit (TRAU);
   determining a set of bits associated with each transport channel of at least two transport channels corresponding to the speech signal via the TRAU;

determining if error checking is required for one or more of the at least two transport channels, wherein the at least two transport channels comprise a first transport channel and a second transport channel, wherein the first transport channel comprises a set of class A bits, and wherein the second transport channel comprises a set of class B bits;

computing error check bits for each transport channel that requires error checking, wherein at least a portion of the class A bits comprises a set of error check bits associated with a cyclic redundancy check;

determining a priority for each set of bits associated with each transport channel via the TRAU;

inserting into a generic TRAU frame, via the TRAU, each set of bits according to the determined priority of each set of bits, wherein the generic TRAU frame is adaptable for use with different codecs; and inserting into the generic TRAU frame the computed error check bits associated with each transport channel that requires error checking, wherein the generic TRAU frame includes, in sequence, the set of class A bits, including the set of error check bits associated with the cyclic redundancy check, and the set of class B bits.

2. The method according to claim 1, further comprising inserting control bits into the generic TRAU frame.

3. The method according to claim 2, wherein the control bits are inserted at a reserved location in the generic TRAU frame.

4. The method according to claim 2, wherein the control bits include a transport format combination indicator.

5. The method according to claim 4, wherein the transport format combination indicator indicates the coding type.

6. The method according to claim 2, wherein the control bits comprise at least one of an indication of a number of transport channels included in the generic TRAU frame, a location in the generic TRAU frame of each set of bits associated with each transport channel, an indication of if error checking applies to the sets of bits inserted in the generic TRAU frame, and a location in the generic TRAU frame of error checking information if error checking applies.

7. The method according to claim 1, wherein the generic TRAU frame comprises an initial set of control bits.

8. The method according to claim 7, wherein the set of cyclic redundancy bits are compiled based on at least one control bit.

9. The method according to claim 1, wherein the step of inserting comprises inserting a higher priority set of bits into the generic TRAU frame before inserting a lower priority set of bits into the generic TRAU frame.

10. The method according to claim 1, further comprising encoding the speech signal to generate a plurality of speech coefficients.

11. The method according to claim 1, wherein the generic TRAU frame is configured via a configuration message used to configure a flexible layer one protocol.

12. A method comprising determining a coding type for a speech signal via a converter;

locating within a generic TRAU frame, via the converter, a set of bits corresponding to each transport channel of a plurality of transport channels based on the coding type, wherein the generic TRAU frame is adaptable for use with different codecs;

locating error check bits associated with a first transport channel of the plurality of transport channels, wherein the plurality of transport channels comprise a first transport channel and a second transport channel, wherein the first transport channel comprises a set of class A bits, and wherein the second transport channel comprises a set of class B bits, wherein at least a portion of the class A bits comprises a set of cyclic redundancy check bits associated with a cyclic redundancy check, and wherein the generic TRAU frame includes, in sequence, the set of class A bits, including the set of cyclic redundancy check bits, and the set of class B bits;

error checking the first transport channel based on the located error check bits; and decoding the plurality of transport channels based on the corresponding set of bits in accordance with the determined coding type.

13. The method according to claim 12, further comprising locating a set of control bits, said control bits including an indication of the coding type of the speech signal.

14. The method according to claim 13, wherein said set of control bits includes a transport format combination identifier.

15. The method according to claim 12, further comprising receiving the generic TRAU frame at a mobile station.

16. The method according to claim 12, wherein the step of decoding comprises mapping each located set of bits into a required format associated with the coding type.

17. A transcoder and rate adaptor unit (TRAU) comprising:
a converter configured to:
determine a coding type for a speech signal;
determine a set of bits associated with each transport channel of a plurality of transport channels of the speech signal;
determine if error checking is required for each transport channel of the plurality of transport channels, wherein the plurality of transport channels comprise a first transport channel and a second transport channel, wherein the first transport channel comprises a set of class A bits, and wherein the second transport channel comprises a set of class B bits;
compute error check bits for each transport channel that requires error checking, wherein at least a portion of the class A bits comprises a set of error check bits associated with a cyclic redundancy check;
determine a priority for each set of bits;
insert into a generic TRAU frame the sets of bits associated with each transport channel of the plurality of transport channels according to the determined priority of each set of bits, wherein the generic TRAU frame is adaptable for use with different codecs; and
insert in the generic TRAU frame the computed error check bits associated with each transport channel that requires error checking, wherein the generic TRAU frame includes, in sequence, the set of class A bits, including the set of error check bits, and the set of class B bits.

18. The TRAU according to claim 17, further comprising a codec configured to encode a signal.

19. The TRAU according to claim 18, wherein the codec is further configured to generate a plurality of speech coefficients.

20. The TRAU according to claim 17, wherein the converter is further configured to insert a higher priority set of bits into the generic TRAU frame before inserting a lower priority set of bits into the generic TRAU frame.

21. The TRAU according to claim 17, wherein the converter is further configured to insert control bits into the generic TRAU frame.

22. The TRAU according to claim 21, wherein the control bits are inserted at a reserved location in the generic TRAU frame.

23. The TRAU according to claim 21, wherein the control bits include a transport format combination indicator.

24. The TRAU according to claim 23, wherein the transport format combination indicator indicates the coding type.

25. The TRAU according to claim 21, wherein the control bits comprise at least one of an indication of a number of transport channels included in the generic TRAU frame, a location in the generic TRAU frame of the set of bits associated with each transport channel, an indication of if error checking applies to the sets of bits of the generic TRAU frame, and a location in the generic TRAU frame of error checking information if error checking applies.

26. The TRAU according to claim 17, wherein the generic TRAU frame comprises an initial set of control bits.

27. The TRAU according to claim 26, wherein the set of cyclic redundancy bits are compiled based on at least one control bit.

28. A transcoder and rate adaptor unit (TRAU) comprising:
a converter configured to
determine a coding type for the speech signal;
locate a set of bits within a generic TRAU frame, wherein the set of bits correspond to each transport channel of a plurality of transport channels based on the coding type, and wherein the generic TRAU frame is adaptable for use with different codecs;
locate error check bits associated with a first transport channel of the plurality of transport channels, wherein the plurality transport channels comprise a first transport channel and a second transport channel, wherein the first transport channel comprises a set of class A bits, and wherein the second transport channel comprises a set of class B bits, wherein at least a portion of the class A bits comprises a set of cyclic redundancy check bits associated with a cyclic redundancy check, and wherein the generic TRAU frame includes, in sequence, the set of class A bits, including the set of cyclic redundancy check bits, and the set of class B bits;
error check the first transport channel based on the located error check bits; and
decode the plurality of transport channels based on the corresponding set of bits in accordance with the determined coding type.

29. The TRAU according to claim 28, wherein the converter is further configured to locate a set of control bits, wherein the set of control bits include an indication of the coding type of the speech signal.

30. The TRAU according to claim 29, wherein the set of control bits includes a transport format combination identifier.

31. The TRAU according to claim 28, wherein the converter is further configured to map each located set of bits into a required format associated with the coding type.

32. A non-transitory computer-readable medium having stored thereon, computer-executable instructions that, if executed by a computing device, cause the computing device to perform operations comprising:
determining a coding type for a speech signal;
determining a set of bits associated with each transport channel of at least two transport channels corresponding to the speech signal;
determining if error checking is required for a transport channel of the at least two transport channels, wherein the at least two transport channels comprise a first transport channel and a second transport channel, wherein the first transport channel comprises a set of class A bits, and wherein the second transport channel comprises a set of class B bits;
computing error check bits for each transport channel that requires error checking, wherein at least a portion of the class A bits comprises a set of error check bits associated with a cyclic redundancy check;
determining a priority for each set of bits associated with each transport channel;
inserting each set of bits into a generic transcoder and rate adaptor unit (TRAU) frame according to the determined priority of each set of bits, wherein the generic TRAU frame is adaptable for use with different codecs; and
inserting into the generic TRAU frame the computed error check bits associated with each transport channel that requires error checking, wherein the generic TRAU frame includes, in sequence, the set of class A bits, including the set of error check bits associated with the cyclic redundancy check, and the set of class B bits.

33. The non-transitory computer-readable medium according to claim 32, wherein the step of inserting further comprises inserting a higher priority set of bits into the generic TRAU frame before inserting a lower priority set of bits into the generic TRAU frame.

34. A non-transitory computer-readable medium having stored thereon, computer-executable instructions that, if executed by a computing device, cause the computing device to perform operations comprising:
determining a coding type for a speech signal;
locating a set of bits within a generic transcoder rate adaptor unit (TRAU) frame, wherein the set of bits correspond to each transport channel of a plurality of transport channels based on the coding type, and wherein the generic TRAU frame is adaptable for use with different codecs; and
locating error check bits associated with a first transport channel of the plurality of transport channels, wherein the plurality transport channels comprise a first transport channel and a second transport channel, wherein the first transport channel comprises a set of class A bits, and wherein the second transport channel comprises a set of class B bits, wherein at least a portion of the class A bits comprises a set of cyclic redundancy check bits associated with a cyclic redundancy check, and wherein the generic TRAU frame includes, in sequence, the set of class A bits, including the set of cyclic redundancy check bits, and the set of class B bits;
error checking the first transport channel based on the located error check bits; and
decoding the plurality of transport channels based on the corresponding set of bits in accordance with the determined coding type.

35. The non-transitory computer-readable medium according to claim 34, wherein the instructions cause the computing device to perform operations further comprising receiving the generic TRAU frame.

36. The non-transitory computer-readable medium according to claim 34, wherein the instructions cause the computing device to perform operations further comprising mapping each located set of bits into a required format associated with the coding type.

37. A network element comprising:
a transcoder and rate adaptor unit (TRAU) configured to:
determine a coding type for a speech signal;
determine a set of bits associated with each transport channel of a plurality of transport channels of the speech signal;

determine if error checking is required for a transport channel of the plurality of transport channels, wherein the plurality transport channels comprise a first transport channel and a second transport channel, wherein the first transport channel comprises a set of class A bits, and wherein the second transport channel comprises a set of class B bits;

compute error check bits for each transport channel that requires error checking, wherein at least a portion of the class A bits comprises a set of error check bits associated with a cyclic redundancy check;

determine a priority for each set of bits; and insert into a generic TRAU frame the sets of bits associated with each transport channel of the plurality of transport channels according to the determined priority of each set of bits, wherein the generic TRAU frame is adaptable for use with different codecs; and insert into the generic TRAU frame the computed error check bits associated with each transport channel that requires error checking, wherein the generic TRAU frame includes, in sequence, the set of class A bits, including the set of error check bits associated with the cyclic redundancy check, and the set of class B bits.

* * * * *

UNITED STATES PATENT AND TRADEMARK OFFICE
CERTIFICATE OF CORRECTION

| | | |
|---|---|---|
| PATENT NO. | : 7,961,675 B2 | Page 1 of 1 |
| APPLICATION NO. | : 10/579404 | |
| DATED | : June 14, 2011 | |
| INVENTOR(S) | : Riddington et al. | |

It is certified that error appears in the above-identified patent and that said Letters Patent is hereby corrected as shown below:

Title page, item (57), under "Abstract", in Column 2, Line 3, delete "Class" and insert -- class --.

Column 9, line 56, in Claim 12, delete "comprising" and insert -- comprising: --.

Column 11, line 20, in Claim 28, delete "to" and insert -- to: --.

Signed and Sealed this
Eighteenth Day of October, 2011

David J. Kappos
*Director of the United States Patent and Trademark Office*